United States Patent [19]
Hammer et al.

[11] Patent Number: 5,096,754
[45] Date of Patent: Mar. 17, 1992

[54] FLAT OR TUBULAR FILM BASED ON CELLULOSE HYDRATE, PROCESS FOR PRODUCING SAME AND SAUSAGE PRODUCTS MADE THEREWITH

[75] Inventors: Klaus-Dieter Hammer, Mainz; Hermann Winter, Wiesbaden, both of Fed. Rep. of Germany

[73] Assignee: Hoechst Aktiengesellschaft, Frankfurt am Main, Fed. Rep. of Germany

[21] Appl. No.: 532,615

[22] Filed: Jun. 4, 1990

[30] Foreign Application Priority Data

Jan. 25, 1990 [DE] Fed. Rep. of Germany ....... 4002083

[51] Int. Cl.$^5$ ................ F16L 11/00; A22C 13/00
[52] U.S. Cl. ................ 428/34.8; 138/118.1; 264/340; 426/105; 426/135; 427/339
[58] Field of Search ............ 428/34.8; 138/118.1; 426/105, 135; 264/340; 427/339

[56] References Cited

U.S. PATENT DOCUMENTS

| | | | |
|---|---|---|---|
| 1,820,538 | 8/1931 | Kennedy | 162/178 |
| 2,913,364 | 11/1959 | Miller et al. | 162/178 |
| 2,998,344 | 8/1961 | Carlson | 162/175 |
| 3,135,613 | 6/1964 | Underwood | 99/176 |
| 3,255,028 | 6/1966 | Fairchild | 162/178 |
| 3,349,079 | 10/1967 | Freedman | 162/178 |
| 3,484,256 | 12/1969 | Chiu et al. | 99/171 |
| 3,805,330 | 4/1974 | Martinek | 264/40.1 |
| 3,882,252 | 5/1975 | Winkler | 426/135 |
| 4,041,183 | 8/1977 | Daniel | 426/135 |
| 4,096,282 | 6/1978 | Higgins et al. | 426/140 |
| 4,299,654 | 11/1981 | Tlach et al. | 162/178 |
| 4,563,376 | 1/1986 | Hammer et al. | 428/34.8 |
| 4,649,961 | 3/1987 | McAllister et al. | 426/135 |

FOREIGN PATENT DOCUMENTS

| | | |
|---|---|---|
| 62-141199 | 6/1987 | Japan . |
| 64-26798 | 1/1989 | Japan . |
| 1091105 | 11/1967 | United Kingdom . |
| 1353015 | 5/1974 | United Kingdom . |

OTHER PUBLICATIONS

Research Disclosure #25718 "Surface Sizing of Paper Using Sodium Alginate in the Present of Calcium Carbonate Fillers", Disclosed by Kelco/AIL International, Ltd., Sep. 1985.

Primary Examiner—James J. Seidleck
Attorney, Agent, or Firm—Foley & Lardner

[57] ABSTRACT

A film, preferably used as a tubular artificial sausage casing, having a base layer of a material which may be fiber-reinforced, wherein the material includes a mixture of cellulose hydrate and alginic acid and/or alginate. The alginate may be the calcium salt of alginic acid. In addition, a process for producing the film by the viscose process is also described, wherein a mixture of alkaline viscose solution and a soluble salt of alginic acid is coagulated by means of an acidic precipitating fluid.

20 Claims, No Drawings

FLAT OR TUBULAR FILM BASED ON CELLULOSE HYDRATE, PROCESS FOR PRODUCING SAME AND SAUSAGE PRODUCTS MADE THEREWITH

BACKGROUND OF THE INVENTION

The present invention relates to a flat or tubular film with a base layer which may be fiber-reinforced and is based on cellulose hydrate, preferably to a packaging film, in particular to a tubular artificial sausage casing, and to a process for manufacturing the same.

Flat, that is to say web-shaped or sheet-like, as well as tubular films, based on cellulose hydrate have been known for a long time and are usually produced by the viscose process. An alkaline solution of cellulose xanthate, generally termed viscose solution, is extruded through an annular die or slot die and coagulated and regenerated to give cellulose hydrate by means of an acidic fluid. The properties of the tubular or flat body of regenerated cellulose can be varied by the composition of the viscose and incorporation of additives. The unreinforced cellulose hydrate films are also called transparent cellulose films and are known under the trademark Cellophane. In the production of fiber-reinforced bodies, a tubular or web-shaped fiber material is coated and impregnated with viscose solution on one or both surfaces and then treated in a conventional manner with coagulation fluid and regeneration fluid. It is also known to bend web-shaped cellulose films, after they have been produced, to form tubing and to join the overlapping edges to one another, forming a longitudinal seam.

Films of this material show good water absorption capacity and are also permeable to water vapor. They are therefore widely used as artificial sausage casings for dry sausage such as, for example, long-life sausage or salami, and used as packaging film.

It is known that cellulose hydrate films become increasingly brittle and hard during storage due to loss of water and plasticizer. This phenomenon is to be ascribed to crystallization occurring in the cellulose material, which leads to the formation of hydrogen bonds in the cellulose structure between the individual cellulose molecules and hence to closer proximity and spatial fixation of the molecules. The consequence of this process of crystallization and structural change is a deterioration, progressing in time, of certain physical properties, in particular of the expansion, strength and swelling value of the film. In addition, the crystallization process causes pronounced shrinkage of the film so that, in the case of tubular packaging based on cellulose, a great increase in the pressure exerted on the enveloped product is to be found during storage.

This process of structural change, gradually proceeding in cellulose hydrate films, and the associated disadvantageous brittleness of the film can be prevented only to a limited extent by the addition of water-soluble, so-called secondary plasticizers. Secondary plasticizers such as, for example, glycerol, propylene glycol or polyglycol, can admittedly improve the softness and handle of the shaped body. Since secondary plasticizing agents are not bound by a chemical bond to the cellulose hydrate molecules, but only by intermolecular forces, they tend to migrate out of the film or are dissolved out of the casing material, especially when the film is put into water, such as is usual for sausage casings made of this material before they are filled with sausage meat, and on scalding and cooking of the sausage.

The consequence is a particularly pronounced brittleness of the plasticizer-free dried cellulose material. In the case of sausage casings with a water vapor barrier layer on the inner surface, the moisture from the sausage meat cannot pass into the cellulose layer. As a result, such casings become shock-sensitive and tend to tear over the entire length when the sausage is cut for the first time. It is therefore typical to moisten briefly sausages having such a sausage casing with cold water before they are cut for the first time. However, this measure cannot prevent, during storage of the cut sausage, bulging of the sausage meat out of the cut surface due to the high internal pressure generated by the dry casing or even it being forced out of the sausage casing at the cut surface.

A further disadvantage of cellulose-based sausage casings manifests itself in the maturing of dry sausage, for example salami. Uniform maturing of these sausage-types demands a very slow release of water from the sausage meat during the first days of maturing. When conventional fiber-reinforced cellulose casings are used, a very high relative atmospheric humidity must prevail in the surroundings for optimum maturing of the sausage, and fluctuations in atmospheric humidity must also be avoided. For this reason, the maturing of dry sausage having a conventional sausage casing of cellulose hitherto had to take place in maturing chambers, in which the relative atmospheric humidity had to be carefully controlled within comparatively narrow limits.

An unduly low or fluctuating moisture content of the surrounding air during maturing of the sausage leads to so-called dry edges on the periphery of the sausage. This undesired phenomenon occurs particularly when the sausage meat dries out too quickly at the outer surface of the sausage in the first days of maturing. The dried outer periphery of the sausage, the so-called dry edge, prevents the further escape of moisture from the core of the sausage, so that the sausage meat in the interior of the sausage is still moist after the usual maturing time and lags behind in maturing. Moreover, the sausage casing no longer adheres sufficiently to the dry edge, so that undesired interspaces between the sausage meat and the casing and creases in the casing are formed.

SUMMARY OF THE INVENTION

It is therefore an object of the present invention to provide cellulose-based films having improved strength, extensibility, swellability and shrinking properties which remain substantially constant even after a prolonged storage time.

Another object is to provide a film which still remains soft and supple, i.e., it does not become brittle, even after the secondary plasticizer has been removed by the action of water.

A further object is to provide sausage casings, wherein the sausages enclosed in the casings should be capable of being transported without problems, that is to say without bursts, and of being cut without tearing even at relatively low relative atmospheric humidity.

A further object is to eliminate the above-mentioned problems which arise in the maturing of dry sausage having a cellulose casing.

It is also an object of the present invention to provide improved food products, especially sausage products, made with the films according to the invention.

In accomplishing the foregoing objects there is provided according to the present invention a film having a base layer of a material which may be fiber-reinforced, wherein the material comprises a mixture of cellulose hydrate and at least one component selected from the group consisting of alginic acid and alginate. The alginate preferably comprises alkali, ammonium and alkaline earth metal salts of alginic acid, especially calcium and sodium alginate.

One embodiment of a process for producing the film according to the present invention comprises adding a water-soluble salt of alginic acid to an alkaline viscose solution to give a homogeneous mixture, forming the homogeneous mixture in the form of a film, and subsequently applying an acidic precipitating fluid to the film so as to coagulate the homogeneous mixture. Preferably, the mixture is formed into a film about a fibrous web of reinforcing material.

In addition, there is provided according to the present invention a food product, preferably a long-life sausage product, having a casing comprised of the above-described film. Preferably, the casing further comprises a fibrous web of reinforcing material, a barrier layer and an intermediate adhesive layer disposed between the film and the food product.

Further objects, features and advantages of the present invention will become apparent from the detailed description of preferred embodiments that follows.

DETAILED DESCRIPTION OF THE PREFERRED EMBODIMENTS

According to the present invention, a flat or tubular film, in particular an artificial cellulose-based sausage casing, includes a base layer of a material essentially composed of a mixture of cellulose hydrate and alginic acid and/or alginate.

The film is in the form of a sheet or web which is to be understood as two-dimensional bodies, the thickness of which is relatively small compared with the two other dimensions. These two-dimensional bodies are, in particular, relatively thin packaging films. In a preferred embodiment, the film is tubular and likewise serves as the packaging casing, for example, for foodstuffs. The tubular film comprises a bent web, the longitudinal axial edges of which are joined to one another by a longitudinal axial seam, and preferably the tubular film is produced without seams. Preferably, the cellulose-based tubular film includes a fiber reinforcement. The tubular film is used, with or without fiber reinforcement, as an artificial sausage casing in sausage manufacturing.

As is known, alginic acids are vegetable polysaccharides containing carboxyl groups, and alginates are the salts of alginic acids. The alginic acid is usually produced as a sodium alginate solution by extraction of brown algae by means of soda solution. Alginates and alginic acids are composed of 1,4-β-glycosidically-linked D-mannuronic acid units with insertions of 1,4-α-glycosidically-linked L-guluronic acid units. Similar to cellulose, they are built-up from long, unbranched chain molecules. Due to the large number of carboxyl groups, the alginates and alginic acids are extremely hydrophilic and are capable of binding 200 to 300 times their weight of water.

The alginic acid embedded according to the present invention in the cellulose carrier material is substantially insoluble in water. It is also possible, additionally or in place of the alginic acid, to bond a salt of alginic acid, in particular an alkali, ammonium or alkaline earth metal salt into the cellulose layer. However, this has the effect that the hydrophilic character and the water-binding capacity of the film are not increased to such a high degree, as compared with the addition of alginic acid. According to the present invention, the alginic acid and even the water-soluble alginats are anchored firmly in the film.

The amount of alginic acid or alginate in the film can be within wide ranges and is 1 to 100%, preferably 3 to 90% and most preferably 5 to 80% by weight, relative to the cellulose. The water content of the film is usually 6 to 30% by weight, relative to the total weight of the film.

The addition, according to the invention, of alginic acid and/or alginate presumably effects a loosening of the cellulose structure, which manifests itself in a significant increase in the water-binding capacity and in the swelling value. Table 1 shows the dependence of the swelling value of a tubular fiber-reinforced cellulose casing (diameter 60 mm) on the alginic acid content.

TABLE 1

| Alginic acid content (% by weight) | Swelling Value (20% by weight glycerol) | (without added glycerol) |
|---|---|---|
| 0 | 120–130 | 70–90 |
| 5 | 130–140 | 100–110 |
| 10 | 140–160 | 110–120 |
| 15 | 160–190 | 125–135 |
| 18 | 190–200 | |

As can be seen from Table 1, the swelling value of the conventional cellulose material having a glycerol content of 20% by weight is reached approximately with material according to the present invention having an alginic acid content from 10 to 15% and no added glycerol. The loosened structure of the film according to the present invention does not impair the mechanical properties of the film. Furthermore, the alginic acid content results in an increase in the hydrophilic character of the film.

The loosened structure of the film is presumably the reason why the film, even from an alginic acid or alginate content as low as only 5% by weight, can surprisingly be processed without the conventional plasticizer, such as glycerol, and with significantly lower water content. Even without added plasticizer, it is sufficiently supple to be able to be shirred mechanically and to be filled with sausage meat under pressure. Thus, the cellulose layer of the film usually contains no further additives apart from alginic acid and/or alginate and water. As a result, there is no risk of plasticizer emission during the manufacturing process, and disposal of the glycerol-containing effluents which arise after the treatment of the casing with water and involve a high biological oxygen demand is also no longer necessary. However, the film may contain, if desired, the plasticizer conventional for cellulose material, if the object is a particularly supple film.

Due to the addition of alginic acid and/or alginate, the film has a delayed water absorption and water release. This property is advantageous particularly when the film is used as a fiber-reinforced sausage casing, as a so-called fiber skin for dry sausage, for example, for long-life sausage or salami types. With increasing alginic acid and/or alginate content, the maturing of sausages having the casing according to the present invention becomes less sensitive to unduly low or fluctuating atmospheric humidity. The casing according to the present invention prevents the problem, arising with conventional cellulose casings, of the formation of dry edges due to non-uniform maturing of cured sausage.

The delayed release of water at 55% relative atmospheric humidity/23° C. from a fiber-reinforced film containing 15% by weight of alginic acid in comparison with a film without this addition can be seen from the values in table 2.

TABLE 2

| Time (hours) | Moisture release | |
| --- | --- | --- |
| | Invention | State of the art |
| 0.5 | 14.3 | 18.0 |
| 1.0 | 22.7 | 25.9 |
| 2.0 | 38.0 | 40.0 |
| 3.0 | 45.0 | 45.3 |

The casing of the present invention thus has typical properties of a collagen casing. In the maturing of cured sausage, the casing is capable, during the critical maturing phase in the first days, of largely compensating varying maturing conditions, due to its higher moisture content. Like collagen casings, the cellulose casing containing alginic acid or alginate less frequently detaches itself, during storage of the sausage, from the sausage meat when the latter shrinks due to drying. This prevents the formation of gaps between the casing and the dried sausage meat, which gaps lead to undesired deposition of jelly under the sausage casing and cause a creased appearance of the casing.

As compared with the conventional cellulose casing, the casing is thus substantially more suitable for the maturing of naturally-matured long-life sausage.

When the film is used as a sausage casing, it has the usual diameter of from 18 to 200 mm, in particular 40 to 130 mm. In the preferred diameter range from 40 to 130 mm, the fiber-reinforced film usually has a weight per unit area of from 50 to 100 g/m$^2$, and the non-reinforced film has a weight per unit area of from 40 to 130 g/m$^2$. In the case of additional secondary plasticizers such as glycerol, the weight per unit area increases as a function of the quantity of plasticizer.

The film is produced by the viscose process. The alginic acid and/or the alginate in aqueous solution, in a water-soluble form, for example as ammonium salt or alkali metal salt of alginic acid, is homogeneously mixed with the alkaline viscose solution in the desired weight ratio, in particular just upstream of the extrusion die. Advantageously, an alginate is used which has a relatively low viscosity in aqueous solution. This includes aqueous sodium alginate solutions which, at a concentration of 1%, show a viscosity (20° C.) of from 10 to 60 and especially 15 to 40 mPa.s. The mixture of viscose and alginate is then extruded in the form of a web or tubing through an extrusion die. In the production of films having a fiber reinforcement such as hemp fiber paper, the fiber web, which may be bent into a tube, is impregnated and coated in a known manner with the mixture of alkaline viscose solution and water-soluble salt of alginic acid. By the action of an acidic precipitating fluid which is usual for precipitating the viscose and typically contains sulfuric acid, the alginic acid, which is sparingly soluble in the acid range, is then also precipitated. The precipitating fluid is present, for example, in a bath, through which runs the extruded viscose solution or the fiber web treated with viscose and, if appropriate, bent into the form of tubing, or the precipitating fluid is applied as a film by means of a die to the extruded viscose or to the fiber web treated with viscose. After passing through the regenerating and washing baths conventional in the production of cellulose hydrate films, the film is dried. For drying to the usual moisture content (8 to 10%) of cellulose casings, however, a comparatively high energy consumption is required because of the high water binding capacity of the alginic acid or of the alginate.

It is also possible to treat the casing before or after drying with an aqueous solution of ammonium, alkali metal or alkaline earth metal cations, e.g., Ca ions in the form of CaCl$_2$, in order to convert the alginic acid partially or completely into the salt of alginic acid. However, an improvement of the casing properties cannot be achieved by the addition of alginate instead of alginic acid.

If the casing is drawn during its production through an alkaline aqueous solution containing alkali sulfide, which is usual for desulfurizing the regenerated cellulose before drying, the resulting alkali metal salts of alginic acid are not dissolved out of the cellulose by the aqueous solution. This shows that even the otherwise water-soluble alkali metal salts of alginic acids are not dissolved out of the cellulose layer because of the molecule size and the spatial arrangement of the alginate molecules. Since the alkali sulfide treatment is usually followed by an acidic washing bath, alginic acid is reformed from the alkali metal salts of alginic acid, so that in general the end product contains the alginic acid but not its alkali metal salt, provided the film is not treated with cations in a specific step as described above.

Before drying, the film is drawn, if desired, through a bath containing a secondary plasticizer, for example an aqueous glycerol solution. However, the addition of a plasticizer is unnecessary when the film is used as an artificial sausage casing, since the film already has the suppleness required for processing. A glycerol-free, tubular, fiber-reinforced cellulose casing having an alginic acid or alginate content of 5% by weight can, surprisingly, be shirred mechanically and processed on filling machines even at a water content of less than 10% by weight.

When the film is used as an artificial sausage casing, it may also have the conventional coatings on the inside and/or outside, for example, a barrier layer against atmospheric oxygen and water vapor on the inside or outside, an inner layer for improving the peeling behavior and/or for improving the adhesion between sausage meat and the inner wall of the casing, or a fungicidal coating on the outside, and it may contain conventional colored pigments, for example, carbon black or TiO$_2$, in a predetermined quantity. As a tubular packaging casing, it is marketed, for example, in a shirred form, as a section tied off on one side or in a laid-flat form as a roll.

The present invention is explained in more detail by the examples which follow. Unless otherwise stated, all percentage data are expressed in % by weight.

EXAMPLE 1

Hemp fiber paper (weight per unit area 17 g/m$^2$) is formed into a tube (diameter 58 mm). The outside of the tube is coated and impregnated with a mixture of ten parts by weight of alkaline viscose solution and one part by weight of 4% aqueous sodium alginate solution having a viscosity of about 20 mPa.s (measured at 20° C. in a 1% aqueous solution of, e.g., ®Protacell 20 made by Protan A/S, Drammen, Norway). The tube treated with viscose is passed through the conventional precipitating, regenerating and washing baths. The plasticizer bath usual for cellulose tubes is omitted. The glycerol-free tube is inflated with supporting air and dried to a moisture content of from 14 to 16%. The finished product contains 5% of alginic acid, relative to the cellulose.

In spite of the absence of plasticizer and the relatively small alginic acid content, the tube is very supple and can be shirred mechanically and tied even at a water content of less than 10%. The conventional filled diameter of the corresponding glycerol-containing and alginate-free fiber-reinforced cellulose casing of from 61 to 62 mm is reached on an automatic filling machine with sausage meat of the salami type. No difficulties arise during filling and clipping. The maturing of the sausage proceeds without any problems. During the first maturing days of the sausage, the exemplified casing contains approximately 5% more water than the corresponding alginate-free casing. As a result, the casing according to the present invention is capable of largely compensating fluctuating humidity values in the surroundings. The formation of dry edges is prevented.

EXAMPLE 2

Hemp fiber paper (weight per unit area 25 $g/m^2$) is formed into a tube (diameter 45 mm). The outside of the tube is coated and impregnated with 10 parts by weight of alkaline viscose solution and 2.6 parts by weight of the 4% alginate solution from Example 1. The tube treated with viscose is treated with acidic precipitating fluid and passed through the conventional regenerating baths. Before running into the dryer, it is coated on its inside with an emulsion of a water-soluble cationic resin and an oil, as described in EP-A-0,088,308. The tube inflated with supporting air is dried to a moisture content of from 12 to 14%. Due to the action of heat, the cationic resin is cured and converted into its water-insoluble form. Preferably the cationic resin is the reaction product of casein/glyoxal. No provision is made for plasticizer treatment. The finished product contains 15% of alginic acid, relative to the cellulose.

The plasticizer-free tube can be mechanically shirred without problems at a moisture content of 16% or less. When long-life sausage meat is forced in by means of a filling device, a filled diameter of from 49 to 50 mm is reached, such as is obtained with conventional alginate-free, glycerol-containing, fiber-reinforced cellulose casings having the same diameter.

The maturing of the sausage proceeds without problems. After the maturing process, the casing can be peeled off from the sausage meat without difficulty. Even under unfavorable maturing conditions (only 80% relative humidity in the first days of maturing), the casing is not detached from the shrunk sausage meat, that is to say no dry edge and no gaps between the sausage casing and sausage meat are formed.

EXAMPLE 3

Hemp fiber paper (weight per unit area 21 $g/m^2$) is formed into a tube (diameter 60 mm). The outside and inside of the paper tube are coated and impregnated in a weight ratio of 3:7 with a mixture of 10 parts by weight of alkaline viscose solution and 2 parts by weight of the 4% alginate solution from Example 1. The tube treated with viscose on the outside and inside is treated on the outside and inside with acidic precipitating fluid and passed through the conventional baths for regenerating the cellulose. Before drying, a solution of conventional resin for improving adhesion of the casing inside to the sausage meat is applied to the inside. In the drier, the tube is dried down to a moisture content of from 12 to 14%. The finished product has an alginic acid content of 11% by weight, relative to the cellulose.

The very supple material can be mechanically tied and mechanically shirred without problems. Casing sections tied on one side and shirred tubes are filled with dry-sausage meat to a conventional diameter of from 65 to 66 mm. Even under unfavorable maturing conditions (only 80% relative humidity in the first maturing days), no dry edges form and the casing remains adhering to the shrunk sausage meat.

EXAMPLE 4

Hemp fiber paper (17 $g/m^2$) is formed into a tube (diameter 45 mm). The outside and inside of the paper tube are coated and impregnated in a weight ratio of 4:6 with a mixture of 10 parts by weight of alkaline viscose solution and 3.4 parts by weight of the 4% alginate solution from Example 1. The paper tube treated on both sides with viscose is treated on the inside and outside with precipitating fluid, and the precipitated cellulose is regenerated to cellulose hydrate in the conventional manner. The inside of the tube is provided with the aqueous solution of a known heat-curable cationic resin which serves as an adhesion promoter for the subsequent application of an oxygen and water vapor barrier layer. Inflated with supporting air, the fiber-reinforced cellulose tube is then passed through a drier, where the water is removed down to a moisture content of from 10 to 12% and the cationic resin cures. The cured resin is, for example, the reaction product formed by crosslinking of polyamine-polyamide with epichlorohydrin. After drying, the tube inside is coated with the aqueous dispersion of a VDC copolymer which, after removal of the water and heating, forms the barrier layer. The finished casing has an alginic acid content of 18.8% by weight, relative to the cellulose.

After filling with cooked-sausage meat, for example of the liver sausage type, or with scalded-sausage meat and treating with hot water in the conventional manner, the casings are still unusually supple. When the sausage is cut, even at relatively low atmospheric humidity, the sausage casing does not tear.

What is claimed is:

1. A film, comprising a layer of material comprising a mixture of:
   a) cellulose hydrate, and
   b) at least one component selected from the group consisting of alginic acid and an alginate.

2. A film as recited in claim 1, wherein the total amount of said alginic acid or said alginate is about 1 to 100% by weight, relative to said cellulose.

3. A film as recited in claim 2, wherein the total amount of said alginic acid or said alginate is about 3 to 90% by weight, relative to said cellulose.

4. A film as recited in claim 3, wherein the total amount of said alginic acid or said alginate is about 5 to 80% by weight, relative to said cellulose.

5. A film as recited in claim 1, wherein said alginate comprises an ammonium, alkali metal or alkaline earth metal salt of alginic acid.

6. A film as recited in claim 1, wherein said alginate comprises sodium or calcium alginate.

7. A film as recited in claim 1, further comprising a plasticizer.

8. A film as recited in claim 1, wherein said film is substantially free of a plasticizer.

9. A film as recited in claim 1, wherein said film is in the form of a shirred tube.

10. A film as recited in claim 1, wherein a barrier layer is coated on at least one surface of said film so as to prevent atmospheric oxygen and water vapor from permeating said film.

11. A food product having a casing comprised of a film according to claim 1.

12. A food product as recited in claim 11, wherein said food product comprises a sausage product.

13. A food product as recited in claim 12, wherein said sausage product comprises a dry sausage which undergoes maturing prior to use.

14. A food product as recited in claim 11, wherein said casing further comprises a fibrous web of reinforcing material.

15. A food product as recited in claim 11, wherein said casing further comprises a barrier layer coated on at least one surface of said film so as to prevent atmospheric oxygen and water vapor from permeating said film.

16. A process for producing a film containing a layer of a mixture of cellulose hydrate and at least one component selected from the group consisting of alginic acid and an alginate, comprising:
   a) adding a water-soluble salt of alginic acid to an alkaline viscose solution to form a homogenous mixture;
   b) forming said homogeneous mixture into a film; and thereafter
   c) applying an acidic precipitating fluid to said film so as to coagulate said homogeneous mixture.

17. A process as recited in claim 16, wherein step (a) comprises adding an alkali metal salt of alginic acid to said viscose solution.

18. A process as recited in claim 16, further comprising after step (c), a step (d) of treating the resultant film with an aqueous solution of a salt of ammonium, alkali metal or alkaline earth metal cations so as to convert a partial amount of the alginic acid precipitated during step (c) to a corresponding salt of the alginic acid.

19. A process as recited in claim 18, wherein step (d) comprises treating the resultant film with an aqueous solution of $CaCl_2$.

20. A process as recited in claim 16, wherein step (b) comprises:
   coating said homogeneous mixture onto a fiber web to form a fiber-reinforced film.

* * * * *